United States Patent
Gomyo et al.

[11] Patent Number: 6,147,424
[45] Date of Patent: Nov. 14, 2000

[54] GAS DYNAMIC PRESSURE BEARING APPARATUS

[75] Inventors: Masato Gomyo; Hideki Kanebako; Kazushi Miura; Masamichi Hayakawa, all of Nagano, Japan

[73] Assignee: Sankyo Seiki Mfg. Co., Ltd., Nagano-ken, Japan

[21] Appl. No.: 09/115,213

[22] Filed: Jul. 14, 1998

[30] Foreign Application Priority Data

Jul. 18, 1997 [JP] Japan .................................. 9-210053
Jul. 18, 1997 [JP] Japan .................................. 9-210054

[51] Int. Cl.$^7$ .................................................. F16C 17/00
[52] U.S. Cl. .............................. 310/90; 384/109; 384/113
[58] Field of Search ................................. 310/90, 67 R; 384/107, 109, 113, 100, 114, 115, 120

[56] References Cited

U.S. PATENT DOCUMENTS

| | | | |
|---|---|---|---|
| 3,969,042 | 7/1976 | Baechler | 417/354 |
| 4,673,997 | 6/1987 | Gowda et al. | 360/107 |
| 4,696,584 | 9/1987 | Tielemans | 384/107 |
| 4,772,136 | 9/1988 | Carter | 384/107 |
| 4,820,950 | 4/1989 | Hijiya et al. | 310/90.5 |
| 4,925,321 | 5/1990 | Maruyama et al. | 384/114 |
| 5,018,880 | 5/1991 | Nakasugi et al. | 384/112 |
| 5,018,881 | 5/1991 | Asada | 384/113 |
| 5,120,139 | 6/1992 | Asada et al. | 384/107 |
| 5,127,744 | 7/1992 | White et al. | 384/112 |
| 5,238,254 | 8/1993 | Takii et al. | 277/80 |
| 5,685,647 | 11/1997 | Leuthold et al. | 384/113 |

FOREIGN PATENT DOCUMENTS

| | | |
|---|---|---|
| 1-288611 | 11/1989 | Japan . |
| 2-11918 | 1/1990 | Japan . |
| 2-113113 | 4/1990 | Japan . |

OTHER PUBLICATIONS

Japanese Abstracts 1–288611, 2–011918 & 2–113113.

*Primary Examiner*—Nestor Ramirez
*Assistant Examiner*—Burt Mullins
*Attorney, Agent, or Firm*—Reed Smith Shaw & McClay LLP

[57] ABSTRACT

A gas dynamic pressure bearing apparatus comprises a fixed shaft, a bearing member which is positioned opposite from the fixed shaft and at least a radial gas dynamic pressure bearing portion and a thrust gas dynamic pressure bearing portion which are positioned in a space between the fixed shaft and the bearing member. Dynamic pressure generating means are included for pressurizing gas in the radial gas dynamic pressure bearing portion and the thrust gas dynamic pressure bearing portion such that dynamic pressure action is generated. The bearing member is rotatably supported in relation to the fixed shaft by means of the pressurizing action such that rotational driving is performed by a predetermined motor. The radial gas dynamic pressure bearing portion and the thrust gas dynamic pressure bearing portion are structured such that gas is sealed from the space around the motor by a space sealing means and that gas flows from one side to other. The flowing gas is circulated between the radial gas dynamic pressure bearing portion and the thrust gas dynamic pressure bearing portion through a gas circulation path. A gas passage is formed on the fixed shaft such that the gas circulation path is connected to the outer end of the fixed shaft. Dust collecting means is formed in one of the gas circulation and the gas passage.

15 Claims, 6 Drawing Sheets

GAS DYNAMIC PRESSURE BEARING APPARATUS

BACKGROUND OF THE INVENTION a) Field of the Invention

The present invention relates to a gas dynamic pressure bearing apparatus which is structured such that a shaft member and a bearing member are rotatably supported with respect to each other due to gas dynamic pressure action at the space therebetween.

b) Description of the Related Art

Conventionally, there are various applications of dynamic pressure bearing apparatus using a dynamic pressure of fluid in various rotation apparatus. Gas dynamic pressure bearings comprise a gas dynamic pressure bearing portion in the space between a shaft member and a bearing member wherein a dynamic pressure generating groove acts on a gas, such as air, introduced in the gas dynamic pressure bearing portion for pressurizing to generate dynamic pressure such that the shaft member and the bearing member are rotatably supported with respect to each other. Types of gas dynamic pressure bearing apparatus include one in which a gas flows from one end to the other inside a radial gas dynamic pressure bearing portion and one in which a gas flows towards both ends from the center of the radial dynamic pressure bearing portion.

In such a gas dynamic pressure bearing apparatus, it has been conventionally suggested that dust, which enters the apparatus, is captured by a filter as a dust collecting means at a gas suction hole such that burn-out of the gas dynamic pressure bearing portion due to the dust can be prevented; such structures are described in Tokkai H 1-288611, Tokkai H2-11918 and Tokkai H2-113113.

However, the above described conventional apparatus cannot be immediately applied to a rotation apparatus, which requires a highly clean environment, such as a hard disc driving motor. For example, with a hard disc driving motor, since regeneration errors and head crashing can be caused by dust adhering to a surface of a hard disc, the entire device is stored in a drive space which is maintained with a highly clean environment.

Nonetheless, in the above described gas dynamic pressure bearing apparatus, the gas dynamic pressure bearing portion stops in the contacting position right after rotation starts or when the rotation is suspended; consequently, dust due to contacting friction is sucked into the drive space from the gas dynamic pressure bearing portion. As a result, the sucked dust may contaminate the hard disc.

In addition, since the head contacts the hard disc surface right after rotation starts, friction electrifies the hard disc. On the other hand, during stable rotation, the rotating portion of the gas dynamic pressure bearing apparatus, including the hard disc is in the non-contacting position; therefore, the hard disc cannot be grounded. As a result, the electrification loads on the hard disc cannot be removed by grounding such that the head may be damaged.

OBJECTS AND SUMMARY OF THE INVENTION

Therefore, a first object of the present invention is to provide a gas dynamic pressure bearing apparatus which has a simple structure wherein contamination is prevented by blocking an exhaust gas from a drive space.

A second object of the present invention is to provide a gas dynamic pressure bearing apparatus in which the disc can be de-electrified even during rotation.

In accordance with the invention, a gas dynamic pressure bearing apparatus comprises a fixed shaft, a bearing member which is positioned opposite from the fixed shaft and at least a radial gas dynamic pressure bearing portion and a thrust gas dynamic pressure bearing portion which are positioned in a space between the fixed shaft and the bearing member. Dynamic pressure generating means are included for pressurizing gas in the radial gas dynamic pressure bearing portion and the thrust gas dynamic pressure bearing portion such that dynamic pressure action is generated. The bearing member is rotatably supported in relation to the fixed shaft by means of the pressurizing action such that rotational driving is performed by a predetermined motor. The radial gas dynamic pressure bearing portion and the thrust gas dynamic pressure bearing portion are structured such that gas is sealed from the space around the motor by a space sealing means and that gas flows from one side to other. The flowing gas is circulated between the radial gas dynamic pressure bearing portion and the thrust gas dynamic pressure bearing portion through a gas circulation path. A gas passage is formed on the fixed shaft such that the gas circulation path is connected to the outer end of the fixed shaft. Dust collecting means is formed in one of the gas circulation and the gas passage.

DESCRIPTION OF THE PREFERRED EMBODIMENTS

The following describes an embodiment applied to a hard disc driving spindle motor, in which a shaft member is fixed, in reference to the drawings.

Figure 1:
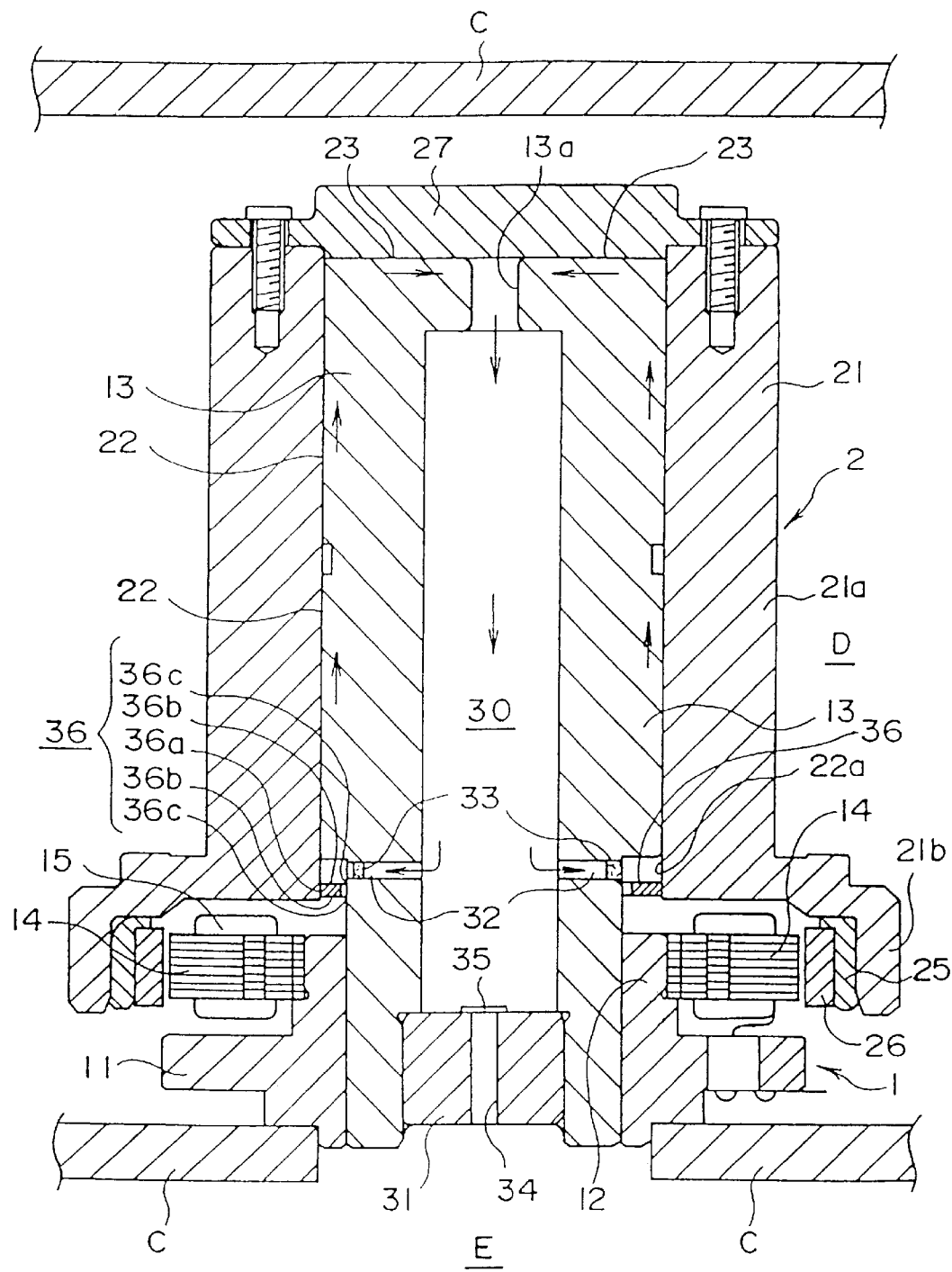
FIG. 1 is a horizontal cross section showing an HDD spindle motor having a gas dynamic pressure bearing apparatus of the first embodiment according to the present invention.

A spindle motor shown in FIG. 1 is an outer rotor type in which one end of a fixed shaft is fixed to a case. This spindle motor is placed in drive space D which is almost completely sealed by drive case C in order to maintain cleanness. Drive space D is connected to the outer atmosphere via a filter for collecting dust (not shown in the figure) such that it can constantly maintain a clean air environment.

The shown spindle motor is formed of stator assembly 1 and rotor assembly 2, which is assembled on stator assembly from the top in the figure. Stator assembly 1 comprises motor frame 11 which is screwed down to the fixed base of drive case C. Fixed shaft 13 as a shaft member extends upward inside support holder 12 formed at the approximate center of motor frame 11.

Also, stator core 14 is attached to the outer side of support holder 12 of motor frame 11. Coil 15 is wound around a projection of stator core 14. Stator core 14 and coil 15 form a stator portion forming a driving portion of the motor.

Rotor assembly 2 comprises hub body 21 as a bearing member. A hard disc, not shown in the figure, is supported on hub body 21. Hub body 21 is rotatably supported in relation to the outer end of fixed shaft 13 via radial gas dynamic pressure bearing portion 22 and thrust gas dynamic pressure bearing portion 23, which will be described later. Hub body 21 comprises approximately cylinder-shaped body 21a; a hard disc is mounted on its outside. Rotor magnet 26 is annularly mounted on mounting annular flange 21b, formed on the open end of body 21a, via back yoke 25. Annular rotor magnet is circularly positioned across from the outer end surface of stator core 14 with a predetermined small gap in the radial direction.

Back yoke 25 comprises an annular magnetic member having an upside-down L-shaped cross section; it is also contactingly fixed on the lower surface of mounting annular flange 21b of hub body 21. Additionally, rotor magnet 26 is formed of a ring member having an approximately rectangular cross section, made of a rare earth bond magnet or sintered magnet. Back yoke 25 and rotor magnet 26 form a rotor portion of the driving portion of the motor.

A pair of radial gas dynamic pressure bearing portions 22 are formed at a distance in the axial direction. Upper and lower gas dynamic pressure surfaces formed on the outer surface of fixed shaft 13 and a pair of gas dynamic pressure bearing portions formed on the inner surface of hub body 21 as a bearing member are positioned to face each other with a predetermined small gap in the radial direction.

In this case, lower open portion 22a of the small gap of lower radial gas dynamic pressure bearing portion 22 is positioned to be open to the top of the inside of stator core 14 in the radial direction. However, magnetic fluid seal 36 as a gas sealing means is formed right underneath of lower open portion 22a of the radial gas dynamic pressure bearing portion such that the driving part of the motor is sealed from drive space D. The structure of magnet fluid seal 36 is discussed later.

Also, a plurality of known spiral dynamic pressure generating grooves (not shown in the figure), for example, are formed in parallel in the circular direction on at least one of the gas dynamic pressure surface on fixed shaft 13 and the gas dynamic pressure surface on hub body 21. During rotation, dynamic pressure is generated in the gas inside the small gap by pressurizing (pumping) action by these dynamic pressure generating grooves; hub body 21 is rotatably supported in relation to fixed shaft 13 by the pressurizing action. Since these dynamic pressure generating grooves and the dynamic pressure action means by these dynamic pressure generating grooves are prior art, detailed explanations regarding those are omitted. These spiral dynamic pressure generating grooves can be formed on either side, fixed shaft 13 or hub body 21.

The dynamic pressure generating grooves, which are formed on radial gas dynamic pressure bearing portion 22 as a dynamic pressure generating means, are grooved in an unbalanced shape such that the dynamic pressure gas flows from radial gas dynamic pressure bearing portion 22 to thrust gas dynamic pressure bearing portion 23. The deviation in the pressurizing action caused by the unbalanced grooves determines the direction of the gas flow to be from radial gas dynamic pressure bearing portion 22 to thrust gas dynamic pressure bearing portion 23.

Specifically, dynamic pressure generating grooves on lower radial gas dynamic pressure portion 22, for example, are formed longer than the ones on the upper radial gas dynamic pressure portion; as a result, gas flows from radial gas dynamic pressure bearing portion 22 to thrust gas dynamic pressure bearing portion 23. However, the means to generate the gas flow is not limited to varying the length of the dynamic pressure generating grooves, but varying their depth or width may be employed as long as the gas flow is from radial gas dynamic pressure bearing portion 22 to thrust gas dynamic pressure bearing portion 23.

Furthermore, disc-shaped thrust plate 27 is screwed to the upper open end of hub body 21 to seal the open end of hub body 21. The lower surface of thrust plate 27 is placed to face the upper end (the upper surface in the figure) of fixed shaft 13 in the axial direction. These two facing surfaces are formed to be gas dynamic pressure surfaces, hence, they are thrust gas dynamic pressure bearing portion 23.

The outer portion of thrust gas dynamic pressure bearing portion 23 facing the gas dynamic pressure surface is connected to the small gaps of radial gas dynamic pressure bearing portion 22; it is structured such that gas is sent from radial gas dynamic pressure bearing portion 22 into the portion of thrust gas dynamic pressure bearing portion 23 facing the gas dynamic pressure surface during rotation for pressurizing by which hub body 21 is rotatably supported in the thrust direction while floating in the axial direction.

As a dynamic pressure generating means with thrust gas dynamic pressure bearing portion 23, dynamic pressure generating grooves similar to the ones on radial gas dynamic pressure bearing portion 22; or, by forming a projection in the axial direction on at least one of sides, thrust plate 27 and fixed shaft 13, pressuring action by the wedging effect of the projection can be used for generation of dynamic pressure.

The dynamic pressure generating means of thrust gas dynamic pressure bearing portion 23 can be obtained by forming unbalanced dynamic pressure generating grooves by changing the length of the grooves such that dynamic pressure gas flows from the outside to the center; as a result, the deviation in the pressurizing action caused by the unbalanced grooves determines the direction of the gas flow to be in one direction.

The gas flow in thrust gas dynamic pressure bearing portion 23 is predetermined such that its only direction is from the outer portion connected to radial gas dynamic pressure bearing portion 22 to the center. Exhaust gas flows out from thrust gas dynamic pressure bearing portion 23 into fixed shaft 13 via hole 13a which is formed at the center of the upper end of fixed shaft 13. In other words, gas passage 30 forming a gas circulation path is formed to pass through the center of fixed shaft 13 in the axial direction; the upper portion of gas passage 30 is connected to the side of thrust gas dynamic pressure bearing portion 23, as described above.

Also, through hole 32 is almost horizontally formed at the lower portion of gas passage 30 such that it passes through fixed shaft 13 in the radial direction. The inside end in the radial direction of through hole 32 is open to gas passage 30. Also, the outside end of through hole 32 is open to the inside space of stator core 14 positioned in the space of the rotational driving source such that it is connected to lower open portion 22a of radial gas dynamic pressure bearing portion 22.

The space between through hole 32 of fixed shaft 13 and radial gas dynamic pressure bearing portion 22 is sealed by magnetic fluid seal 36 from the driving portion of the motor, which is positioned in the motor space and drive space D. In other words, magnetic fluid seal 36 is positioned right underneath of through hole 32 of fixed shaft 13 and radial gas dynamic pressure bearing portion 22. A pair of pole pieces 36b, 36b are almost horizontally mounted on both end surfaces of annular permanent magnet 36a which is fixed to the inside wall of hub body 21. Also, conductive magnetic fluids 36c, 36c, which are held at inner peripheries of the pair of pole pieces 36b, 36b, are fixed to the outer surface of fixed shaft 13 such that a sealing mechanism is formed.

In this case, fixed shaft 13 and hub body 21 as a bearing member are made of conductive metal such as aluminum; therefore, fixed shaft 13 and hub body 21 are electrically connected to each other. As a result, hub body 21 and a hard disc held thereon are grounded while fixed shaft 13 is grounded.

Also, filter 33 as a dust collecting means is formed at the open part of the outside of through hole 32 in the radial direction. Filter 33 captures dust in the gas passing through gas passage 30 of fixed shaft 13, then cleaned gas enters radial gas dynamic pressure bearing portion 22.

Furthermore, lid 31 is engaged to the open part at the lower outer portion of gas passage 30 of fixed shaft 13 from the lower side. Also, gas passage 30 is connected to outer space E, which is outside the driving portion of the motor and drive space D forming the motor, via connecting hole 34 passing through lid 31. Filter 35 as a dust collecting means is formed at the upper open portion of connecting hole 34 formed on lid 31 to gas passage 30; dust between gas passage 30 of fixed shaft 13 and outer space E outside drive space D are captured by filter 35 to clean the gas.

As shown above, in the first embodiment, radial gas dynamic pressure bearing portion 22 and thrust gas dynamic pressure bearing portion 23 are connected via hole 13a, gas passage 30 and through hole 32 of fixed shaft to form a gas circulation path through which gas for generation of dynamic pressure flows in one direction as indicated by arrows.

Also, the above gas circulation path is sealed from the space, in which the driving portion of the motor forming a rotational driving source, and drive space D by magnetic fluid seal 36. Additionally, when (the volume of) the gas fluctuates due to changes in the pressure of gas circulation path, the gas enters or exits between the above gas circulation path and outer space E via gas passage 30.

According to the first embodiment as described above, the gas circulating between radial gas dynamic pressure bearing portion 22 and thrust gas dynamic pressure bearing portion 23 flows while being sealed from the driving portion of the motor and space D. Therefore, dust generated in the gas dynamic pressure bearings are prevented from entering cleaned drive space D. As a result, space D is always maintained clean; hence, rotational driving can be performed without contaminating a hard disc. In this case, clean gas through filter 33 is sent into radial gas dynamic pressure bearing portion 22 such that burning out of radial gas dynamic pressure bearing portion 22 can be prevented.

Additionally, according to the first embodiment, hub body 21, which holds a hard disc on the rotation side and which is made of a conductive material, is electrically connected to fixed shaft 13 made of a conductive material via magnetic fluid seal 36 using a conductive magnetic fluid. As a result, by grounding fixed shaft 13, both hub body 21 and the hard disc held thereon are constantly maintained to be grounded. Consequently, electrification loads can be excellently removed even during rotation such that the head can be electrically protected.

Figure 2:
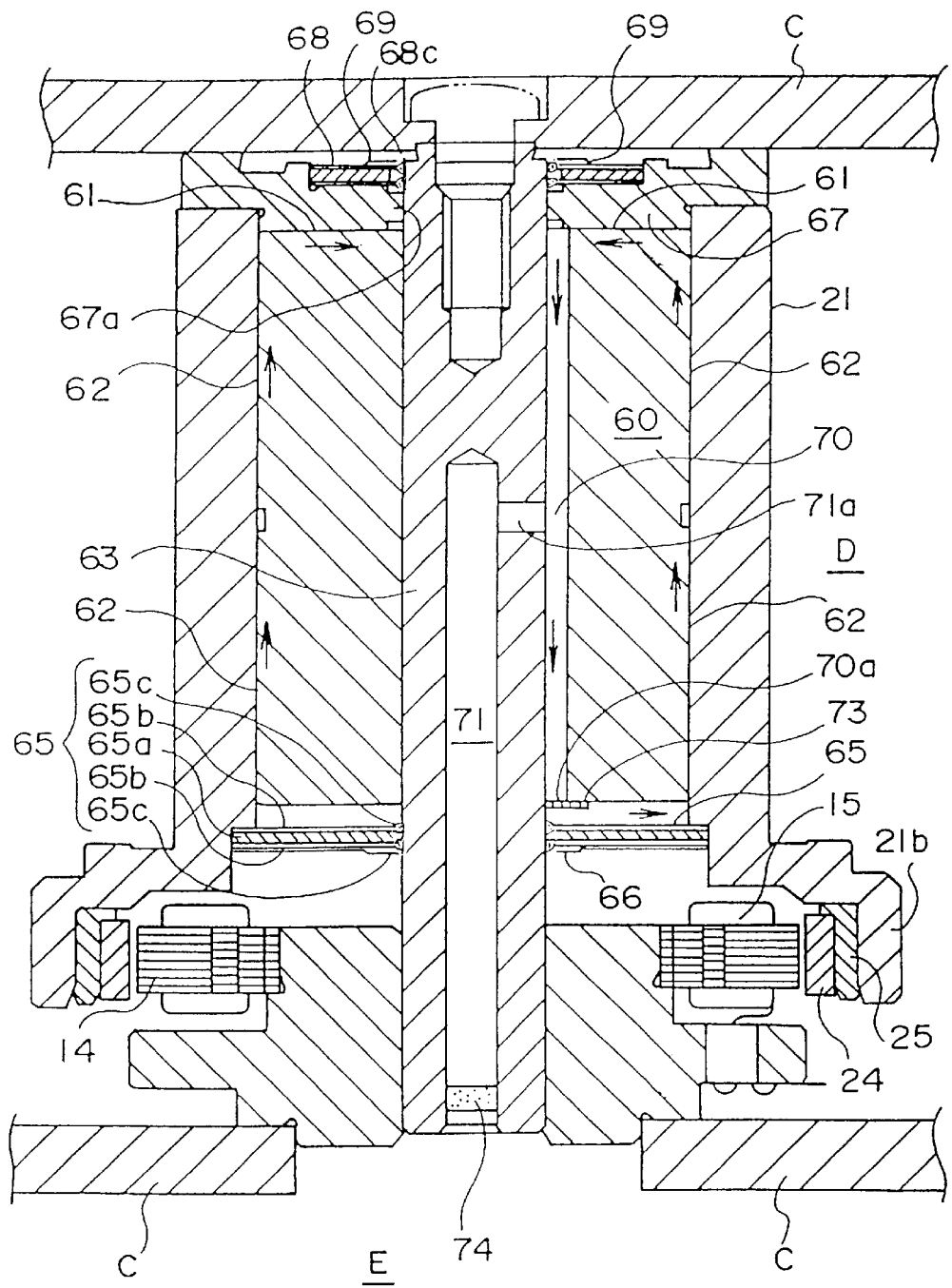
FIG. 2 is a horizontal cross section showing the second embodiment of the present invention.

The second embodiment 2 shown in FIG. 2 is an HDD spindle motor in which both ends of a fixed shaft are fixed to Drive case C. Members common to the structure shown in FIG. 1 are indicated with identical symbols and descriptions about these members are omitted; the rest are described in the following.

In the spindle motor shown. in FIG. 2, the upper and lower ends of fixed shaft 63 as a shaft member are screwed down to almost completely sealed drive case C. Also, two gas dynamic pressure surfaces, which are formed on the outer surface of bearing sleeve 60 engaged to the outside of fixed shaft 63 with a given distance therebetween in the axial direction, similar to FIG. 1, and two gas dynamic pressure bearing surfaces, which are formed on the inner surface of hub body 21 as a bearing member, are positioned across from each other in the radial direction with a given small gap. Also, two radial gas dynamic pressure bearing portions 62 are formed at a given distance in the axial direction.

In this case, magnetic fluid seal 65 is placed right underneath of the lower surface of radial gas dynamic pressure bearing portion 62 to seal the circulation path for dynamic pressure gas from the space, in which the driving portion of the motor is located, and drive space D. In magnetic fluid seal 65, conventionally, a pair of pole pieces 65b, 65b are almost horizontally mounted on both end surfaces of annular permanent magnet 65a which is fixed to the inside wall of hub body 21. Also, conductive magnetic fluids 65c, 65c, which are held at inner peripheries of the pair of pole pieces 65b, 65b, are fixed to the outer surface of fixed shaft 63 such that a sealing mechanism is formed.

Fixed shaft 63 and hub body 21 are made of conductive metal; therefore, fixed shaft 63 and hub body 21 are electrically connected to each other. As a result, hub body 21 and a hard disc held thereon are grounded while fixed shaft 63 is grounded.

Also, seal plate 66 is formed to cover magnetic fluid seal 65 from the outside (the bottom side in the figure). Even when magnetic fluid seal 65 is damaged, seal plate 66 functions to prevent dust such as friction powder, from escaping to the outside of the motor. Therefore, the outer circumference of seal plate 66 is fixed to hub body 21, and its inner circumference is placed adjacent to fixed shaft 63 for sealing.

A plurality of spiral dynamic pressure generating grooves similar to the ones of the first embodiment in FIG. 1 (not shown in FIG. 2) are formed in parallel in the circular direction on at least one of the gas dynamic pressure surfaces on bearing sleeve 60 and the gas dynamic pressure surfaces on hub body 21. During rotation, dynamic pressure is generated in the gas inside the small gap by pressurizing (pumping) action by these dynamic pressure generating grooves; hub body 21 is rotatably supported in relation to fixed shaft 63 by the pressurizing action.

In this case, the dynamic pressure generating grooves, which are formed on radial gas dynamic pressure bearing portion 62 as a dynamic pressure generating means, are grooved into an unbalanced shape such that the dynamic pressure gas flows from radial gas dynamic pressure bearing portion 62 to thrust gas dynamic pressure bearing portion 61. The deviation in the pressurizing action caused by the unbalanced grooves determines the direction of the gas flow to be in one direction.

Furthermore, disc-shaped thrust plate 67 is screwed to the upper open end of hub body 21 such that the hole at the center of thrust plate 67 is connected through the upper end of fixed shaft 63. The space between outer surface of fixed shaft 63 projecting through thrust plate 67 upward and the hole at the center of thrust plate 67 is sealed by magnetic fluid seal 68.

In other words, magnetic fluid 68 is mounted on the upper surface of thrust plate 67; a pair of pole pieces are almost horizontally mounted on both end surfaces of an annular permanent magnet. Also, conductive magnetic fluid 68c, which is held at the inner periphery of the pair of pole pieces, is fixed to the outer surface of fixed shaft 63.

Since fixed shaft 63 as a shaft member and hub body 21 as a bearing member are electrically connected via magnetic fluid seal 68 such that hub body 21 is also grounded while fixed shaft 63 is grounded.

Also, seal plate 69 is formed to cover magnetic fluid seal 68 from the outside (the upside in the figure). Even when magnetic fluid seal 66 is damaged, seal plate 69 functions to prevent dustuch as friction powder, from escaping to the outside of the motor. Therefore, the outer circumference of seal plate 69 is fixed to thrust plate 67, and its inner circumference is placed adjacent to fixed shaft 63 for sealing.

On the other hand, the lower surface of thrust plate 67 is positioned across from the end surface of bearing sleeve 60 (upper surface in the figure) in the axial direction. These facing surfaces in the axial direction are independently formed on gas dynamic pressure surfaces to form thrust gas dynamic pressure bearing portion 61.

The facing outer circumferences of both gas dynamic pressure surfaces on thrust gas dynamic pressure bearing portion 61 are connected to small gaps of radial gas dynamic pressure bearing portion 62. During rotation, it is structured such that gas is sent from radial gas dynamic pressure bearing portion 62 into portion of thrust gas dynamic pressure bearing portion 61 facing the gas dynamic pressure surfaces for pressurizing by which hub body 21 is rotatably supported in the thrust direction while floating in the axial direction.

As a dynamic pressure generating means with thrust gas dynamic pressure bearing portion 61, dynamic pressure generating grooves are shaped into unbalanced grooves such that dynamic pressure gas flows from the outer circumference connected to radial gas dynamic pressure bearing portion 62 to the center. It is structured such that gas in thrust gas dynamic pressure bearing portion 61 is exhausted from open portion 70a at the lower end of gas passage 70 via gas passage as a gas circulation path formed inside bearing sleeve 60 to the space above magnetic fluid seal 65; as a result, the exhausted gas is circulated inside radial gas dynamic pressure bearing portion 62.

In this case, filter 73 as a dust collecting means is placed at open portion 70a at the lower end of gas passage 70. Dust in the gas passing through gas passage 70 is captured by filter 73 such that cleaned gas enters inside radial gas dynamic pressure bearing portion 62.

Also, branched passage 71a of gas passage 71 formed inside fixed shaft 63 is open to the middle portion of gas passage 70 formed inside bearing sleeve 60. In other words, gas passage 71, part of the gas circulation path, is formed to pass through the center of fixed shaft 63. The upper end of gas passage 71 is connected to gas passage 70 having gas circulated from thrust gas dynamic pressure portion 61.

Furthermore, the lower end of gas passage 71 in fixed shaft 63 is connected to the driving portion of the motor and outer space E outside drive space D; filter 74 as a dust collecting means is positioned at the open portion of gas passage 71. As a result, dust in the gas flowing between gas passage 71 of fixed shaft 63 and outer space E is removed.

As described above, in the second embodiment, the gas circulation path is formed by connecting radial gas dynamic pressure bearing portion 62 and thrust gas dynamic pressure bearing portion 61 via gas passage 70 formed in bearing sleeve 60; the gas for generation of dynamic pressure flows through the gas circulation path in one direction as indicated by arrows in the figure.

Also, the above gas circulation path is sealed from the space of the driving portion of the motor and drive space D by magnetic fluid seal 65. Additionally, when (the volume of) the gas fluctuates due to changes in the pressure in the gas circulation path, gas enters or exits between the above gas circulation path and outer space E via gas passages 70, 71. Therefore, the gas circulated between radial dynamic pressure bearing portion 62 and thrust dynamic pressure bearing portion 61 flows while sealed from the driving portion of the motor and drive space D such that dustuch as friction powder, generated inside the gas dynamic pressure bearings is prevented from entering cleaned drive space D. Consequently, inside drive space D is constantly maintained clean such that rotational driving can be performed without contaminating a hard disc.

Additionally, clean gas through filter 73 is sent into radial gas dynamic pressure bearing portion 62 such that burning out of radial gas dynamic pressure bearing portion 62 can be prevented. Moreover, hub body 21 holding a hard disc is constantly maintained to be grounded via magnetic fluid seal 65 using a conductive magnet fluid. Consequently, electrification loads can be excellently removed even during rotation such that the head can be electrically protected.

In the second embodiment shown in FIG. 2, seal projection 67a is uniformly formed in the inside space of thrust plate 67 such that a small gap is formed with the outside of fixed shaft 63; the projection forms a labyrinth seal to protect magnetic fluid seal 68 with the inner surface of seal projection 67a. Such a labyrinth seal can be placed right above lower magnetic fluid seal 65.

Figure 3:
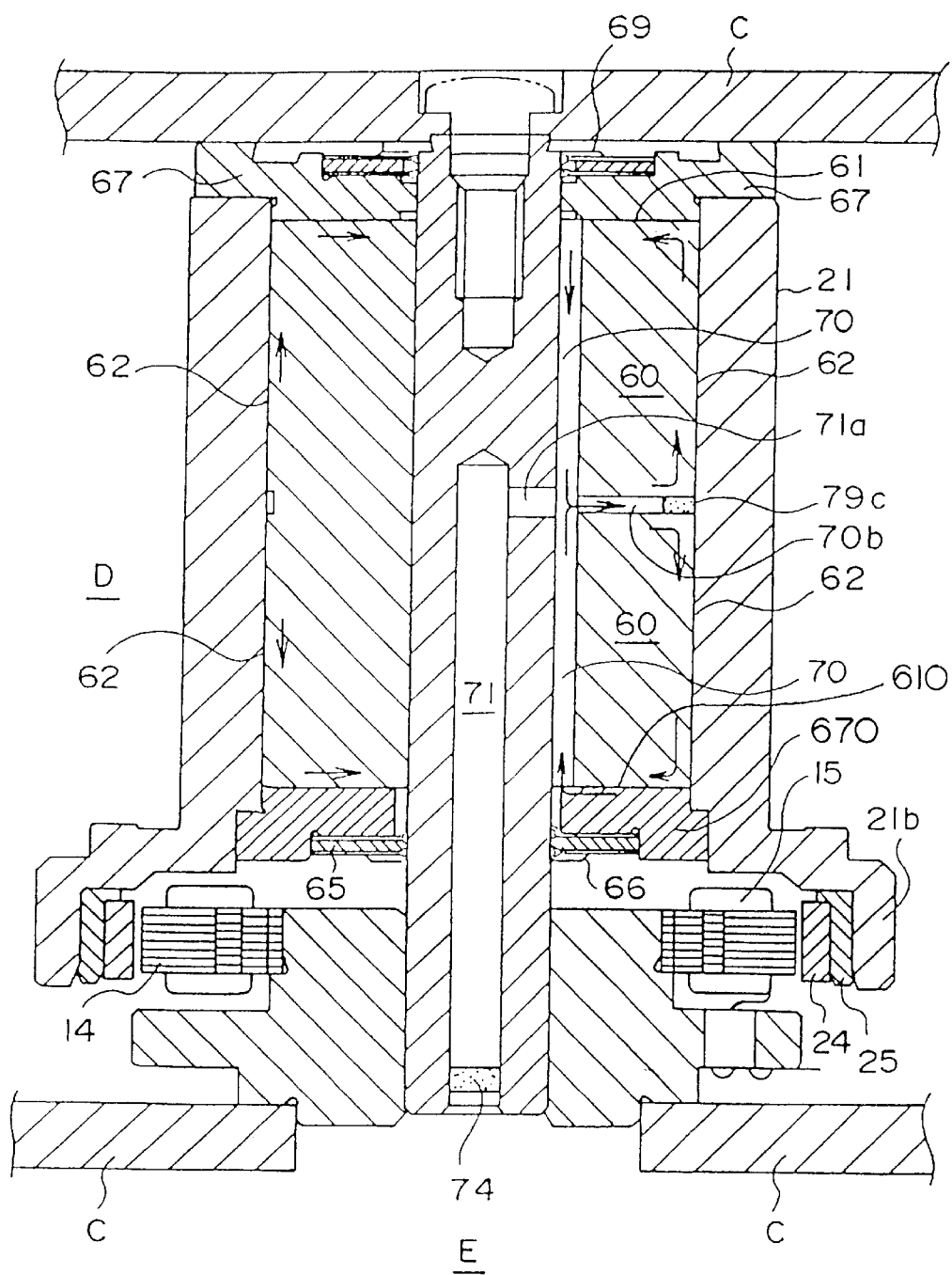
FIG. 3 is a horizontal cross section showing the third embodiment of the present invention.

The third embodiment 3 shown in FIG. 3 is an HDD spindle motor similar to the one in FIG. 2. Members common to the structure shown in FIG. 2 are indicated with identical symbols and descriptions about these members are omitted; the rest are described in the following.

Through hole 70b, which extends from gas passage 70 in the radial direction, is formed to almost horizontally pass through the center of bearing sleeve 60. The middle portion of gas passage 70 is connected to two radial gas dynamic pressure bearing portions 62, 62 via through hole 70b.

Also, thrust plate 670, similar to thrust plate 67 formed at the top of radial gas dynamic pressure bearing portion 62, is formed at the bottom of lower radial gas dynamic pressure bearing portion 62. Therefore, lower thrust gas dynamic pressure bearing 610 is formed.

Furthermore, dynamic pressure generating grooves on upper radial gas dynamic pressure bearing portion 62 are formed into an unbalanced shape such that dynamic pressure gas flows from radial gas dynamic pressure bearing portion 62 to upper thrust gas dynamic pressure bearing portion 61. The deviation in the pressurizing action caused by the unbalanced grooves determines the direction of the gas flow to be only upward direction. Also, dynamic pressure generating grooves on lower radial gas dynamic pressure bearing portion 62 are formed into an unbalanced shape such that dynamic pressure gas flows from radial gad dynamic pressure bearing portion 62 to lower thrust gas dynamic pressure bearing portion 61. The deviation in the pressurizing action caused by the unbalanced grooves determines the direction of the gas flow to be only downward direction.

On the other hand, the dynamic pressure generating means of thrust dynamic pressure bearing portions 61 is unbalanced grooves such that dynamic pressure gas flows from the outside to the center. The deviation in the pressurizing action caused by the unbalanced grooves results in circulation of the gas.

Also, the gas from upper thrust gas dynamic pressure bearing portion 61 and lower thrust gas dynamic pressure bearing portion 610 returns to the middle portions of radial gas dynamic pressure bearing portions 62, 62 via gas passage 70 and through hole 70b; a gas circulation path is formed accordingly. In the third embodiment, similar actions/effects can be obtained as in the first and second embodiments.

The above first, second and third embodiments describe gas dynamic pressure bearing apparatus in which radial gas dynamic pressure bearing portion and thrust gas dynamic pressure bearing portion are sealed from the space of a rotational driving source by a space sealing means, a gas circulation means is formed to circulate gas between the radial gas dynamic pressure bearing portion and thrust gas dynamic pressure bearing portion and a dust collecting means is formed in the gas circulation means.

The following describes the fourth embodiment having a structure to send clean gas cleaned by a dust collecting means or clean gas from drive space D through a space of a stator assembly and a rotor assembly forming a motor.

The fourth embodiment differs from other embodiments in that a magnetic fluid seal is not placed to seal a gas circulation path from the space of the stator assembly and the rotor assembly forming the motor and drive space D.

Figure 4:
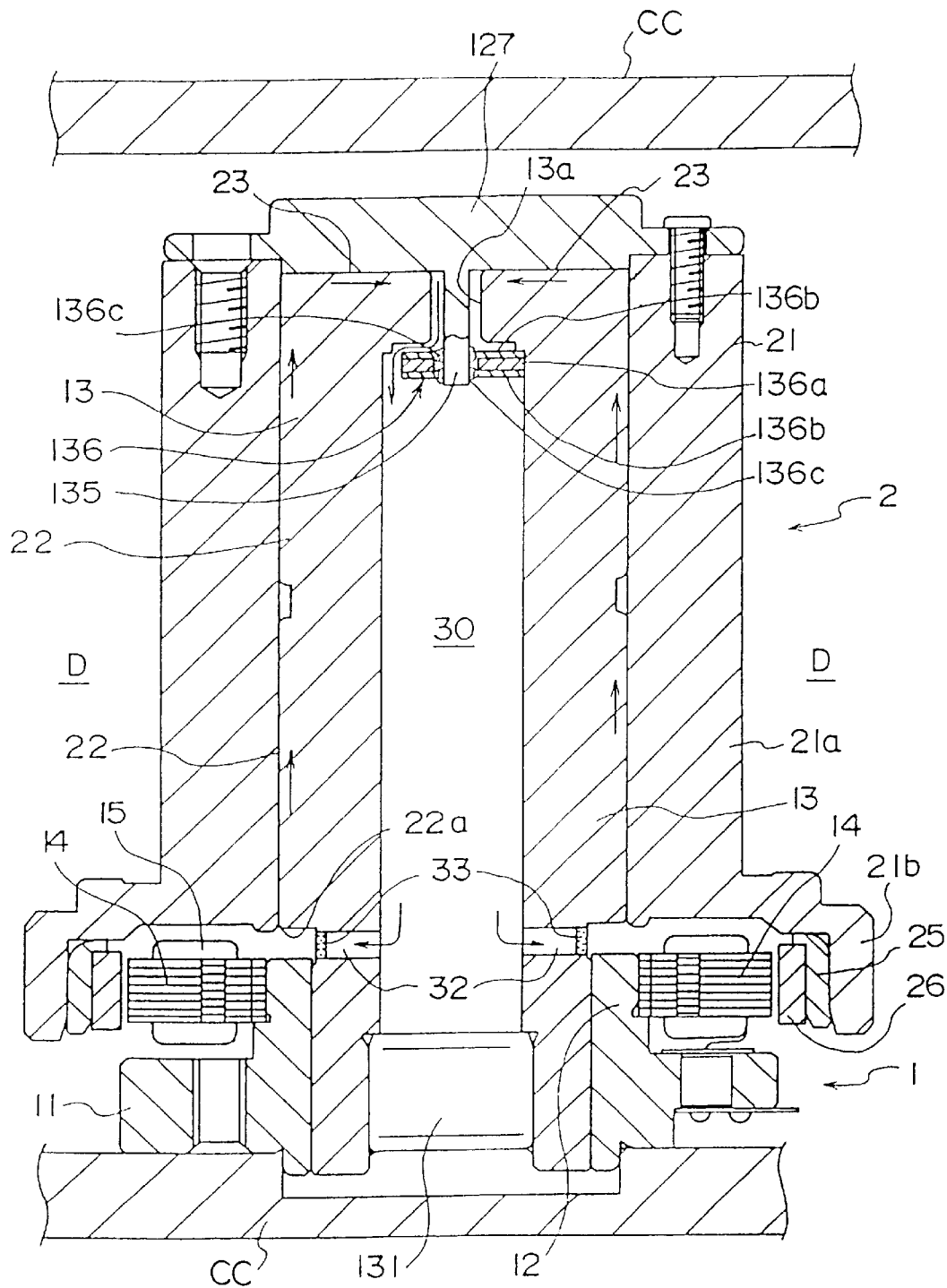
FIG. 4 is a horizontal cross section showing the fourth embodiment of the present invention.
Figure 5:
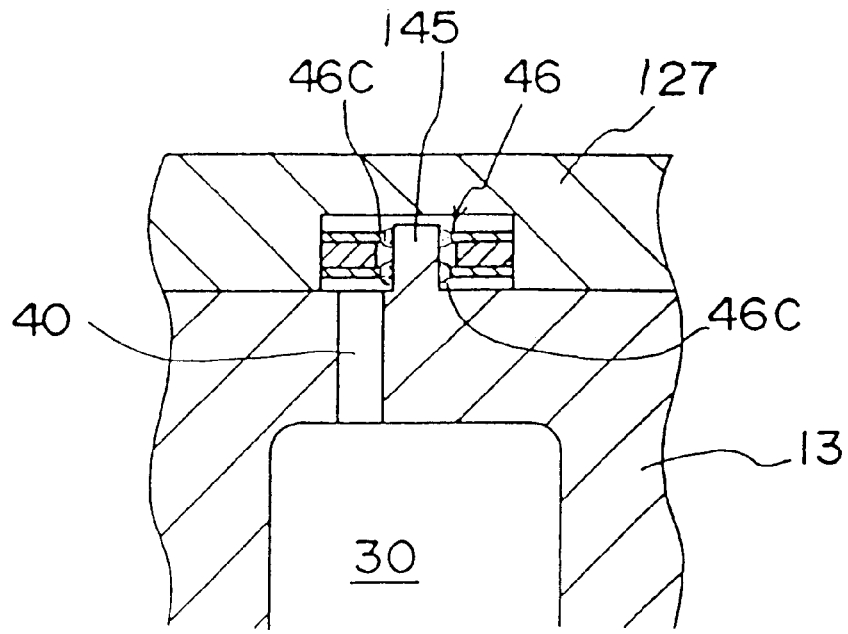
FIG. 5 is an enlarged horizontal cross section of the fifth embodiment of the present invention.

An HDD spindle motor shown in FIG. 4 is an outer rotor motor, in which one end of a fixed shaft is fixed to a case, having an essential structure the same as the motor shown in FIG. 1; therefore, detail descriptions are omitted.

This spindle motor is formed of stator assembly 1 and rotor assembly 2. Stator assembly 1 comprises motor frame 11 which is screwed down to a fixed base of drive case CC. Furthermore, fixed shaft 13 as a shaft member stands in support holder 12 at the center of motor frame 11 to extend upward. In the fourth embodiment, the motor is stored in drive case CC.

A pair of radial gas dynamic pressure bearing sections 22 are formed in the axial direction similar to the first embodiment shown in FIG. 1. However, in the fourth embodiment of FIG. 4, lower portion 22a of a small gap of lower radial gas dynamic pressure bearing portion 22 is open to the inside in the radial direction of stator core 14. Clean gas in drive space D is sent through the space of stator assembly 1 and rotor assembly 2 of the motor into the small gap of radial gas dynamic pressure bearing portion 22, or clean gas from the exit of the gas circulation path is sent through a dust collecting means into the small gap of radial gas dynamic pressure bearing portion 22.

Also, spiral dynamic pressure generating grooves are formed on at least one of the gas dynamic pressure surfaces on fixed shaft 13 and hub body 21; however, they are similar to the ones in the first embodiment of FIG. 1, therefore, descriptions are omitted.

In the fourth embodiment, the dynamic pressure generating grooves on radial gas dynamic pressure bearing portion 22 are also formed into an unbalanced shape such that pressurized gas flows from radial gas dynamic pressure bearing portion 22 to thrust gas dynamic pressure bearing portion 23. The deviation in the pressurizing action caused by the unbalanced grooves results in flow of the gas.

Similar to the one shown in FIG. 1, hole 13a is formed at the center of upper part of fixed shaft 13. Through hole 13a, exhaust gas flows from thrust gas dynamic pressure bearing portion into fixed shaft 13. On the other hand, the lower part of gas passage 30 is completely sealed by lid 131 engaged to gas passage 30 from the bottom.

Also, through hole 32 is formed at the lower part of gas passage formed in fixed shaft 13 as a circulation path passing through fixed shaft 13 in the radial direction. The inner end of in the radial direction of through hole 32 is open to gas passage 30 while the outer end is open to the space of the driving portion of the motor to continue to the inside of drive space D through the space around stator assembly 1 and rotor assembly 2.

In this case, filter 33 as a dust collecting means is formed at the open portion at the outside in the radial direction of through hole 32. Dust in the through hole after passing thorough gas passage 30 of fixed shaft 13 is captured by filter 33 such that gas contaminated by friction powder generated in the gas dynamic pressure bearing portion is prevented from entering the clean driving portion of the motor and drive D.

In the fourth embodiment, a gas entering path is formed to connect the driving portion of the motor, connected to drive space D, to radial gas dynamic pressure bearing portion 22 and thrust gas dynamic pressure bearing portion 23. After clean gas in drive space D enters radial gas dynamic pressure bearing portion 22 via the driving portion of the motor, as indicated by arrows in the figure, the clean gas is sent from radial gas dynamic pressure bearing portion 22 to thrust gas dynamic pressure bearing portion 23. Also, a gas exiting path is formed between thrust gas dynamic pressure bearing portion 23 and the driving portion of the motor via gas passage 30 of fixed shaft 13 and through hole 32. Through the gas exiting path, gas cleaned by filter 33 is sent into drive D via the driving portion of the motor.

In FIG. 4, thrust plate 127 placed across from the upper surface of fixed shaft 13 in the axial direction, similar to the one in FIG. 1, is designed such that its facing surfaces in the axial direction are formed as gas dynamic pressure surfaces structuring thrust gas dynamic pressure bearing portion 23. De-electrification pin 135 projects downward from the center of the bottom surface of thrust plate 127 projecting into gas passage 30 of fixed shaft 13. The end of de-electrification pin 135 of thrust plate 127 is electrically connected to fixed shaft 13 via magnetic fluid seal 136.

In other words, magnetic fluid seal 136 is mounted on the inner wall of the upper end of gas passage 30 of fixed shaft 13. A pair of pole pieces 136b, 136b are almost horizontally mounted on both end surfaces of annular permanent magnet 136a. Also, conductive magnetic fluids 136c, 136c, which are held at inner peripheries of the pair of pole pieces 136b, 136b, are fixed to the ends of de-electrification pin 135 of thrust plate 127.

Fixed shaft 13 made of a conductive material such as aluminum and hub body 21 as a bearing member made of conductive material such as aluminum are electrically connected by the magnetic fluid seal. Therefore, hub body 21 and a hard disc held thereon are grounded while grounding fixed shaft 13. Also, these conductive materials are not limited to metals; resins can be used.

According to the fourth embodiment, dust in gas sent from radial gas dynamic pressure bearing portion 22 via thrust gas dynamic pressure bearing portion 23 is captured by filter 33 formed at through hole 32 as a dust collecting means. As a result, gas contaminated by friction powder generated in the gas dynamic pressure bearing portion is prevented from entering the clean driving portion of the motor and drive D. Therefore, drive space D is constantly maintained clean such that rotational driving is performed without contaminating the hard disc.

Also, clean gas is sent from the driving portion of the motor or drive space D to radial gas dynamic pressure bearing portion 22 such that burning out of the gas dynamic pressure bearing portion is prevented without a dust collecting means at an entrance of radial gas dynamic pressure bearing portion 22 from which gas enters therein. Additionally, hub body 21 holding a hard disc on the rotation side is constantly grounded via magnetic fluid seal 36; as a result, electrification loads can be excellently removed from the hard disc even during rotation such that the head can be electrically protected.

The following describes the fifth embodiment; de-electrification pin 145 projects from the top surface of fixed shaft 13, to which conductive magnetic fluid 46c of magnetic fluid seal 46 on thrust plate 127 is held. De-electrification pin 145 is placed along the axis of fixed shaft 13, and connecting path 40 passes through the side of fixed shaft 13 to gas passage 30, forming a gas circulation path. In the fifth embodiment, de-electrification action similar to the ones in other embodiments can be obtained.

Figure 6:
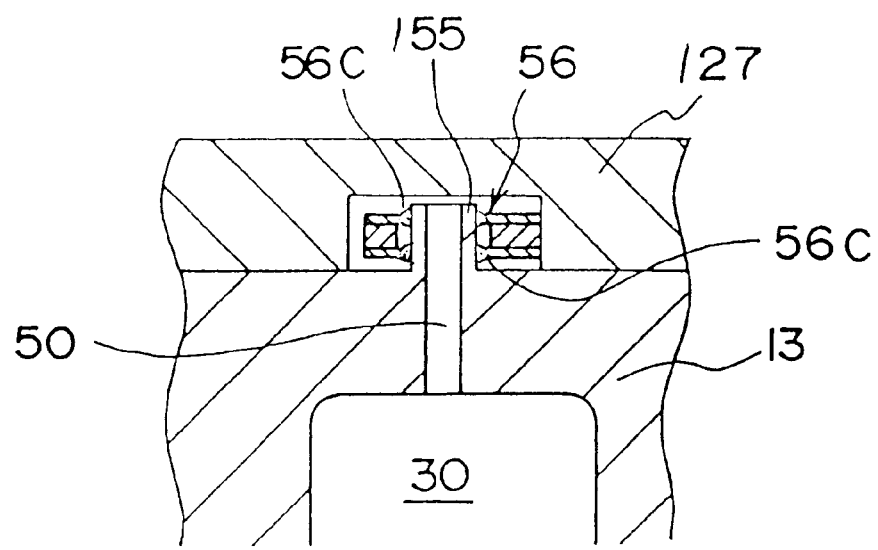
FIG. 6 is a horizontal cross section showing the sixth embodiment of the present invention.

Also, in the sixth embodiment shown in FIG. 6, similar to the fifth embodiment, de-electrification pin 155 projects from the top surface of fixed shaft 13, to which conductive magnetic fluid 56c of magnetic fluid seal 56 on thrust plate 127 is held. Connecting path 50 is formed passing through the inside of de-electrification pin 155 to gas passage 30 forming a gas circulation path for pressurized gas. In the sixth embodiment, de-electrification action similar to the ones in other embodiments can be obtained.

Figure 7:
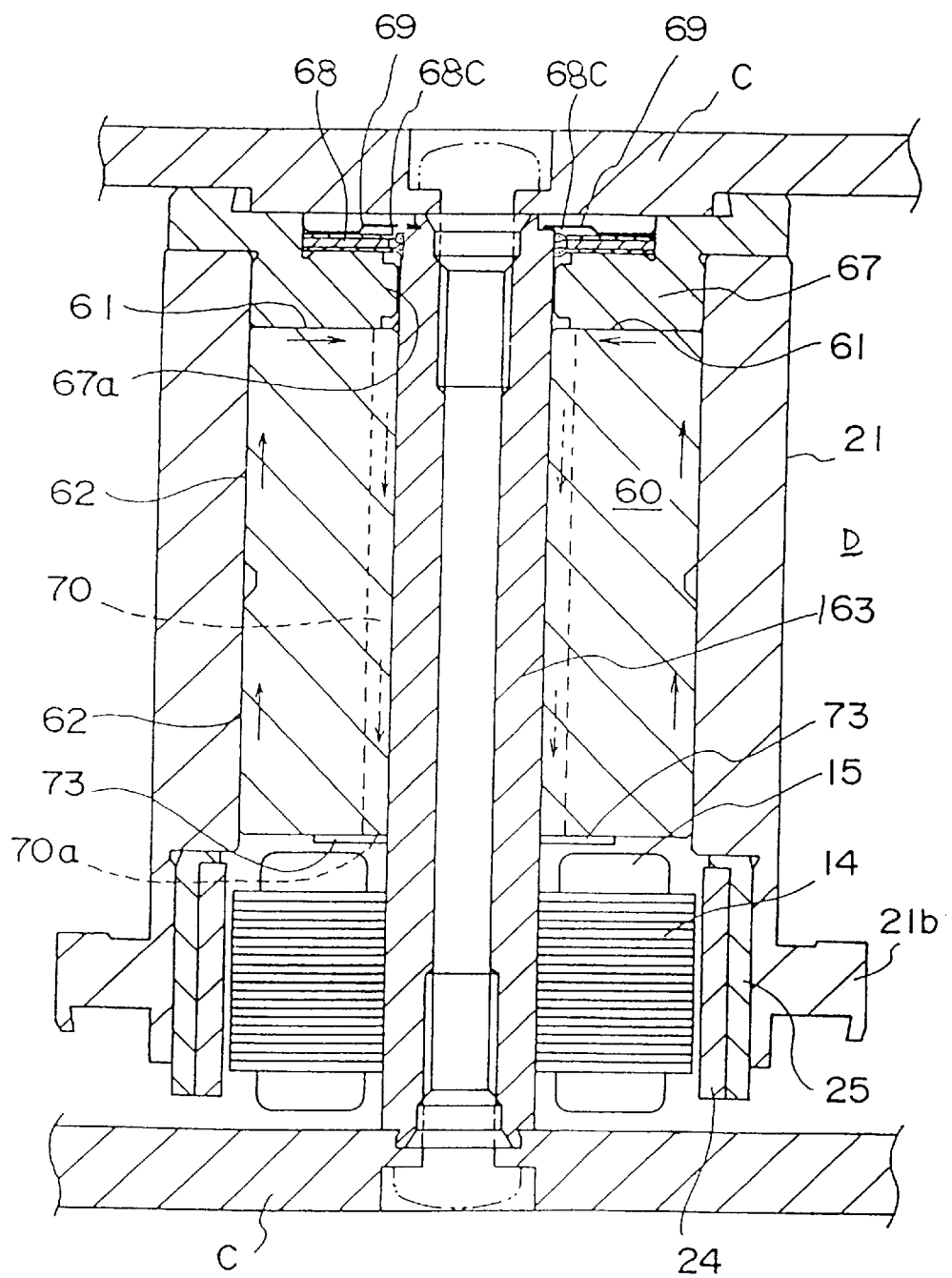
FIG. 7 is a horizontal cross section showing the seventh embodiment of the present invention.

The following shows the seventh embodiment shown in FIG. 7, which is an HDD spindle motor having both ends of a fixed shaft fixed onto drive case C.

In this spindle motor, the upper and lower ends of fixed shaft 163 are screwed down to the almost completely sealed drive case C. Two gas dynamic pressure surfaces, which are formed on the outer surface of bearing sleeve 60 with a given distance therebetween in the axial direction, and two gas dynamic pressure surfaces, which are formed on the inner surface of hub body 21 as a bearing member, are arranged to face each other in the axial direction with a given small gap. Also, two radial gas dynamic pressure bearing portions 62 are formed at a given distance in the axial direction. Since radial gas dynamic pressure bearing portions 62 are the same as the ones in the second embodiment shown in FIG. 2, descriptions are omitted.

Disc-shaped thrust plate 67 is screwed to the upper open end of hub body 21. The lower surface of thrust plate 67 and the upper surface of bearing sleeve 60, which face to each other in the axial direction, are formed to be gas dynamic pressure surfaces such that thrust gas dynamic pressure bearing portion 61 is formed. This structure is the samesas the one of the second embodiment, therefore, detailed descriptions are omitted.

In the seventh embodiment, the gas flow in thrust gas dynamic pressure bearing portion 61 is directed from the outer side, connected to radial gas dynamic pressure bearing portion 62, to the center. More specifically, the gas flows from lower open portion 70a through gas exhaust passage 70, which is formed inside bearing sleeve 60, into the space inside in the radial direction of stator core 14 forming the stator portion of the driving portion of the motor, then is directed to the driving portion of the motor through the space between stator assembly 1 and rotor assembly 2.

In this case, filter 73 as a dust collecting means is placed at lower open portion 70a of gas exhaust passage 70. Dust in the gas passing through gas exhaust passage 70 is captured by filter 73 such that clean gas is directed to drive space D via the driving portion of the motor.

Also, in the seventh embodiment, a gas entering path is formed to connect radial gas dynamic pressure bearing portion 62 and thrust gas dynamic pressure bearing portion 61 via drive space D and the driving portion of the motor. Therefore, clean gas in drive D and the driving portion of the motor is sent to thrust gas dynamic pressure bearing portion 61 after entering radial gas dynamic pressure bearing portion 62. Also, a gas exiting path is formed between thrust gas dynamic bearing portion 61 and the driving portion of the motor via gas exhaust passage 70 such that the gas flowing in the gas exiting path is cleaned by filter 73 before entering the driving portion of the motor.

Therefore, dust in the gas passing through radial gas dynamic pressure bearing portion 62 then thrust gas dynamic pressure bearing portion 61 is captured by filter 73 as a dust collecting means formed at the gas exhaust passage such that gas contaminated by friction powder and the like generated in the gas dynamic pressure bearing portions is not directed to the clean driving portion of the motor and drive space D. Consequently, only clean gas is exhausted into drive space D through the driving portion of the motor such that the inside drive space D is constantly maintained clean. Therefore, rotational driving can be performed without contaminating a hard disc.

In this case, clean gas from drive space D is sent into the radial gas dynamic pressure bearing portion through the driving portion of the motor such that burning out of the gas dynamic pressure bearing portion can be prevented without forming a dust collecting means at the gas entrance of radial gas dynamic pressure bearing portion 62. Also, hub body 21 holding a hard disc on the rotation side is constantly maintained to be grounded via magnetic fluid seal 69 using a conductive magnetic fluid such that electrification loads can be excellently removed even during rotation such that the head can be electrically protected.

The above explained the present invention invented by the present inventors. However, one is not limited to the above embodiments; various modifications are applicable within a scope of the present invention.

For example, all the above embodiments are HDD spindle motors; however, the present invention can be similarly applied to various rotational devices. Also, the present invention is not limited to a fixed-shaft type; it can be similarly applied to a rotational-shaft type in which a shaft uniformly rotates with a hub body.

Additionally, in the above embodiments, pressurized gas flows from the radial gas dynamic pressure bearing portion to the thrust gas dynamic pressure bearing portion; however, it is possible to construct an apparatus in which pressurized gas flows from a thrust gas dynamic pressure bearing portion to a radial gas dynamic pressure bearing portion, inversely.

Furthermore, the present invention is a gas dynamic pressure bearing apparatus using air in general. However, one is not limited to this; the present invention can be applied to bearing apparatus using gasses other than air.

According to the present invention, a gas dynamic pressure bearing apparatus has a structure in which a gas circulation path is formed such that dynamic pressure gas flows from one of a radial gas dynamic pressure bearing portion and thrust gas dynamic pressure bearing portion, which are sealed from a space of a motor by a space sealing means, to the other and dust, such as friction powder generated in the gas dynamic pressure bearing portions, is prevented from entering a clean drive space by forming a dust collecting means at a gas passage connecting the gas circulation path to the outer end of a fixed shaft or at the gas circulation path.

Therefore, the apparatus can accomplish the following:

a simple structure is obtained the drive space is maintained clean such that contamination of a disc and the like can be prevented; and as a result reliability can be increased.

Also, in the present invention, a gas dynamic pressure bearing apparatus has a structure in which a gas circulation path is formed such that the dynamic pressure gas flows from one of the radial gas dynamic pressure bearing portion and the thrust gas dynamic pressure bearing portion to the other and a dust collecting means is formed in the gas circulation path such that dust in the gas from the gas dynamic pressure bearing portions is captured by the dust collecting means, and consequently, gas contaminated by friction powder and the like is prevented from entering the drive space.

Therefore, the apparatus can accomplish the following:

a simple structure is obtained, the drive space is maintained clean such that contamination of a disc and the like can be prevented and as a result reliability can be increased.

While the foregoing description and drawings represent the preferred embodiments of the present invention, it will be obvious to those skilled in the art that various changes and modifications may be made therein without departing from the true spirit and scope of the present invention.

What is claimed is:

1. A gas dynamic pressure bearing apparatus comprising:
   a fixed shaft;
   a bearing member which is positioned opposite from said fixed shaft;
   at least a radial gas dynamic pressure bearing portion and a thrust gas dynamic pressure bearing portion which are positioned in a space between said fixed shaft and said bearing member;
   dynamic pressure generating means for pressurizing gas being included in said radial gas dynamic pressure bearing portion and said thrust gas dynamic pressure bearing portion such that dynamic pressure action is generated;
   said bearing member being rotatably supported in relation to said fixed shaft by means of said pressurizing action such that rotational driving is performed by a predetermined motor;
   said radial gas dynamic pressure bearing portion and said thrust gas dynamic pressure bearing portion being structured such that gas is sealed from a space around said motor by a space sealing means and that gas flows from one of said radial gas dynamic pressure bearing and said thrust gas dynamic pressure bearing to the other of said radial gas dynamic pressure bearing and said thrust gas dynamic pressure bearing;
   said flowing gas being circulated between said radial gas dynamic pressure bearing portion and said thrust gas dynamic pressure bearing portion through a gas circulation path;
   a gas passage being formed on said fixed shaft such that said gas circulation path is connected to the outer end of said fixed shaft; and
   dust collecting means being formed in one of said gas circulation path and said gas passage, said dust collecting means being mounted along a path and through which said gas flows and adapted to collect dust from all of said gas flowing through said one of said gas circulation path said gas passage.

2. The gas dynamic pressure bearing apparatus according to claim 1 which is structured to have a deviation in a pressurizing action such that said gas pressurizing action of said dynamic pressure generating means provides gas flow from one of said radial dynamic pressure bearing portion or said thrust dynamic pressure bearing portion to the other.

3. The gas dynamic pressure bearing apparatus according to claim 1 in which at least one of said radial dynamic pressure bearing portion and said thrust dynamic pressure bearing portion is formed into an unbalanced shape such that said gas pressurizing action of said dynamic pressure generating means provides gas flow from one side to the other.

4. The gas dynamic pressure bearing apparatus according to claim 1 in which:
   said space sealing means is formed of a magnetic fluid seal using a conductive magnetic fluid;
   said magnetic fluid seal is formed between a fixed shaft, made of a conductive material, and a bearing member, made of a conductive material;
   said fixed shaft and said bearing member are electrically connected via said magnetic fluid seal; and
   said bearing member is grounded via said magnetic fluid seal and said fixed shaft.

5. The gas dynamic pressure bearing apparatus according to claim 1 in which:
   said bearing member is a hub body which supports a disc;
   said thrust gas dynamic pressure bearing portion is formed on one end of said fixed shaft; and
   a stator portion, which forms a driving portion of said motor, is assembled on the other end of said fixed shaft.

6. The gas dynamic pressure bearing apparatus according to claim 1 in which the entire apparatus is positioned in a drive space which is such that clean gas is maintained inside a sealed case.

7. A gas dynamic pressure bearing apparatus comprising:
   a fixed shaft;
   a bearing member which is positioned across from said fixed shaft;
   a stator assembly of a motor which is formed on said fixed shaft;
   a rotor assembly of said motor which is formed on said bearing member;
   at least a radial gas dynamic pressure bearing portion and a thrust gas dynamic pressure bearing portion which are positioned in a space between said fixed shaft and said bearing member;
   dynamic pressure generating means for pressurizing gas being included in said radial gas dynamic pressure bearing portion and said thrust gas dynamic pressure bearing portion such that dynamic pressure action is generated;
   said bearing member being rotatably supported in relation to said fixed shaft by means of said pressurizing action;
   said radial gas dynamic pressure bearing portion and said thrust gas dynamic pressure bearing portion being formed such that gas flows from one of said radial gas dynamic pressure bearing and said thrust gas dynamic pressure bearing to the other of said radial gas dynamic pressure bearing and said thrust gas dynamic pressure bearing;

said flowing gas being circulated between said radial gas dynamic pressure bearing portion and said thrust gas dynamic pressure bearing portion through a gas circulation path;

said gas circulation gas being connected to a motor space formed between said stator assembly and said rotor assembly; and dust collecting means being placed in front of said motor space in said gas circulation path.

8. The gas dynamic pressure bearing apparatus according to claim 7 which is structured to be uneven such that said gas pressurizing action of said dynamic pressure generating means provides gas flow from one of said radial dynamic pressure bearing portion or said thrust dynamic pressure bearing portion to the other.

9. The gas dynamic pressure bearing apparatus according to claim 7 in which:

said gas circulation path includes a gas passage formed inside said fixed shaft; and a dust collecting means is formed in said gas passage inside said fixed shaft.

10. The gas dynamic pressure bearing apparatus according to claim 7 in which:

said fixed shaft and said bearing member being made of a conductive material;

a magnetic fluid seal using a conductive magnetic fluid being formed between said fixed shaft and said bearing member;

said fixed shaft and said bearing member being electrically connected via said magnetic fluid seal; and said bearing member being grounded via said magnetic fluid seal and said fixed shaft.

11. The gas dynamic pressure bearing apparatus according to claim 7 in which:

said thrust gas dynamic pressure bearing portion is formed on one end of said fixed shaft; and a stator portion, which forms a drive portion of said motor, is assembled to the other end of said fixed shaft.

12. The gas dynamic pressure bearing apparatus according to claim 7 in which the entire apparatus is positioned in a drive space which is such that clean gas is maintained inside a sealed case.

13. The gas dynamic pressure bearing apparatus according to claim 12 in which:

a gas circulation path is structured of:

a gas entering path which sucks said clean gas in said drive space into said radial gas dynamic pressure bearing portion via said motor space to send said gas to said thrust dynamic pressure bearing portion; and a gas exiting path which exhausts gas inside said thrust gas dynamic pressure bearing portion to said drive space via said motor space.

14. A gas dynamic pressure bearing apparatus comprising:

a shaft member;

a bearing member which is positioned opposite from said shaft member; at least a radial gas dynamic pressure bearing portion and a thrust gas dynamic pressure bearing portion which are positioned in a space between said shaft member and said bearing member;

dynamic pressure generating means for pressurizing gas being included in said radial gas dynamic pressure bearing portion and said thrust gas dynamic pressure bearing portion such that dynamic pressure action is generated;

said bearing member and said shaft member being rotatably supported in relation to each other by means of said pressurizing action such that rotational driving is performed by a predetermined motor; and said gas dynamic pressure bearing apparatus comprises:

space sealing means for sealing said radial gas dynamic pressure bearing portion and said thrust gas dynamic pressure bearing portion from the space around said motor;

a gas circulation path in which said radial gas dynamic pressure bearing portion and said thrust gas dynamic pressure bearing portion are structured such that gas flows from one side of said gas circulation path to the other and which circulates said flowing gas between said radial gas dynamic pressure bearing portion and said thrust gas dynamic pressure bearing portion;

a gas passage which connects said gas circulation path to an outer portion of said motor; and dust collecting means which is formed at one of said gas circulation path and said gas passage, said dust collecting means being mounted along a path through which said gas flows and adapted to collect dust from all of said gas flowing through said one of said gas circulation path and said gas passage.

15. A gas dynamic pressure bearing apparatus comprising:

a shaft member;

a bearing member which is positioned across from said shaft member;

a stator assembly and a motor assembly, which rotatably support said shaft member and said bearing member in relation to each other;

at least a radial gas dynamic pressure bearing portion and a thrust gas dynamic pressure bearing portion which are formed at the space between said shaft member and said bearing member;

dynamic pressure generating means for pressurizing gas being included in said radial gas dynamic pressure bearing portion and said thrust gas dynamic pressure bearing portion such that dynamic pressure action is generated;

said shaft member and said bearing member being rotatably supported by said pressurizing action; and said gas dynamic pressure bearing apparatus comprises:

a gas circulation path in which said radial gas dynamic pressure bearing portion and said thrust gas dynamic pressure bearing portion are structured such that gas flows from one side of said gas circulation path to the other and which circulates said flowing gas between said radial gas dynamic pressure bearing portion and said thrust gas dynamic pressure bearing portion; and a motor space which is connected to said gas circulation path and which is formed by said stator assembly and said rotor assembly; and dust collecting means which is placed in front of said motor space in said gas circulation path.

* * * * *